US012296638B2

(12) United States Patent
Masuda

(10) Patent No.: US 12,296,638 B2
(45) Date of Patent: May 13, 2025

(54) CONTROLLER, VEHICLE, AND CONTROL METHOD

(71) Applicant: Robert Bosch GmbH, Stuttgart (DE)

(72) Inventor: Makoto Masuda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 18/001,122

(22) PCT Filed: May 27, 2021

(86) PCT No.: PCT/IB2021/054624
§ 371 (c)(1),
(2) Date: Dec. 8, 2022

(87) PCT Pub. No.: WO2021/255557
PCT Pub. Date: Dec. 23, 2021

(65) Prior Publication Data
US 2023/0226874 A1 Jul. 20, 2023

(30) Foreign Application Priority Data
Jun. 18, 2020 (JP) ................................ 2020-105376

(51) Int. Cl.
*B60G 17/06* (2006.01)
(52) U.S. Cl.
CPC ........ *B60G 17/06* (2013.01); *B60G 2400/102* (2013.01); *B60G 2400/204* (2013.01);
(Continued)
(58) Field of Classification Search
None
See application file for complete search history.

(56) References Cited

U.S. PATENT DOCUMENTS 5,295,705 A * 3/1994 Butsuen ................. B60G 17/08
280/5.515
5,430,646 A * 7/1995 Kimura ................ B60G 17/015
280/5.515
(Continued)

FOREIGN PATENT DOCUMENTS

DE 4205223 A1 8/1992
JP H07179113 A 7/1995
(Continued)

OTHER PUBLICATIONS

International Search Report and Written Opinion for Application No. PCT/IB2021/054624 dated Aug. 31, 2021 (13 pages).

*Primary Examiner* — Isaac G Smith
*Assistant Examiner* — Jennifer M Anda
(74) *Attorney, Agent, or Firm* — Michael Best & Friedrich LLP

(57) ABSTRACT

The present invention obtains a controller capable of suppressing worsening of comfort of an occupant in a vehicle when compared to the background art.
The controller according to the present invention is a controller that is mounted to the vehicle and outputs a command signal corresponding to a damping coefficient of a shock absorber to an actuator that adjusts the damping coefficient of the shock absorber of a damping force adjustment type. In the case where, in the vehicle, a portion on a wheel side with the shock absorber being a reference is set as an unsprung portion, where a state where a frequency of the unsprung portion is higher than a prescribed frequency is set as a first frequency state, and where a state where the frequency of the unsprung portion is lower than the prescribed frequency is set as a second frequency state, the controller is configured to output, to the actuator, such a command signal that reduces the damping coefficient of the shock absorber to be smaller than the damping coefficient of (Continued)

the shock absorber in the second frequency state when a state becomes the first frequency state.

7 Claims, 6 Drawing Sheets

(52) U.S. Cl.
CPC .... *B60G 2400/208* (2013.01); *B60G 2400/91* (2013.01); *B60G 2500/10* (2013.01)

(56) References Cited

U.S. PATENT DOCUMENTS

| | | | |
|---|---|---|---|
| 5,490,068 A * | 2/1996 | Shimizu | B60G 17/08 |
| | | | 280/5.515 |
| 5,944,153 A * | 8/1999 | Ichimaru | B60G 17/015 |
| | | | 280/5.515 |
| 2010/0207343 A1 | 8/2010 | Sano | |
| 2011/0025001 A1* | 2/2011 | Kajino | B60G 17/08 |
| | | | 280/5.515 |
| 2013/0166149 A1* | 6/2013 | Liu | B60G 17/015 |
| | | | 701/37 |
| 2017/0334261 A1* | 11/2017 | Tsumano | B60G 17/06 |
| 2020/0023704 A1 | 1/2020 | Toyohira | |

FOREIGN PATENT DOCUMENTS

| | | |
|---|---|---|
| JP | 2009120009 A | 6/2009 |
| JP | 2012206560 A | 10/2012 |

* cited by examiner

[FIG. 1]
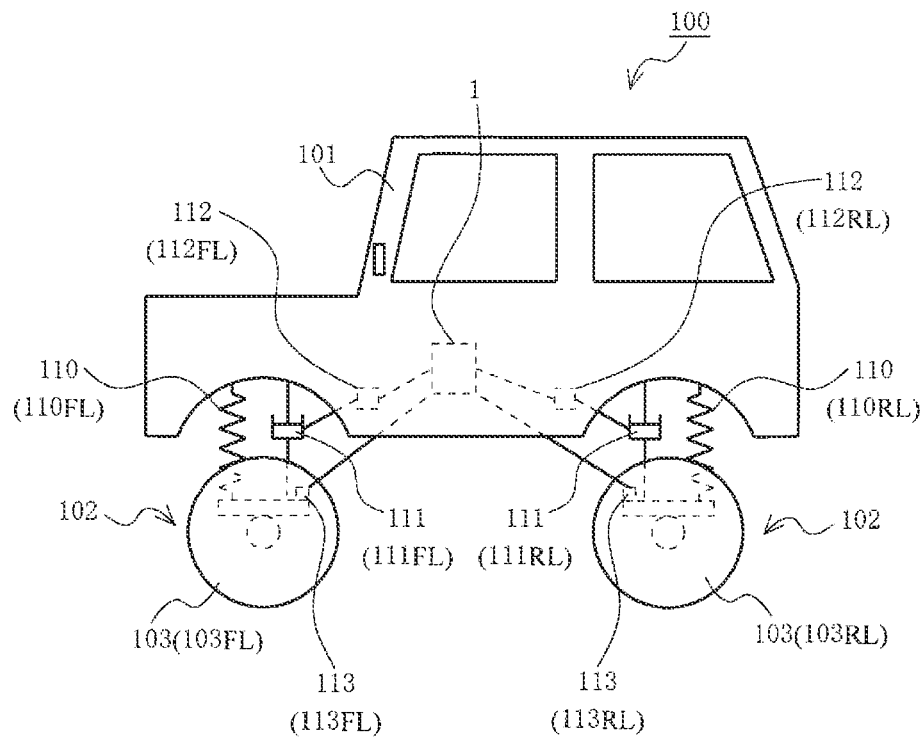
[FIG. 2]
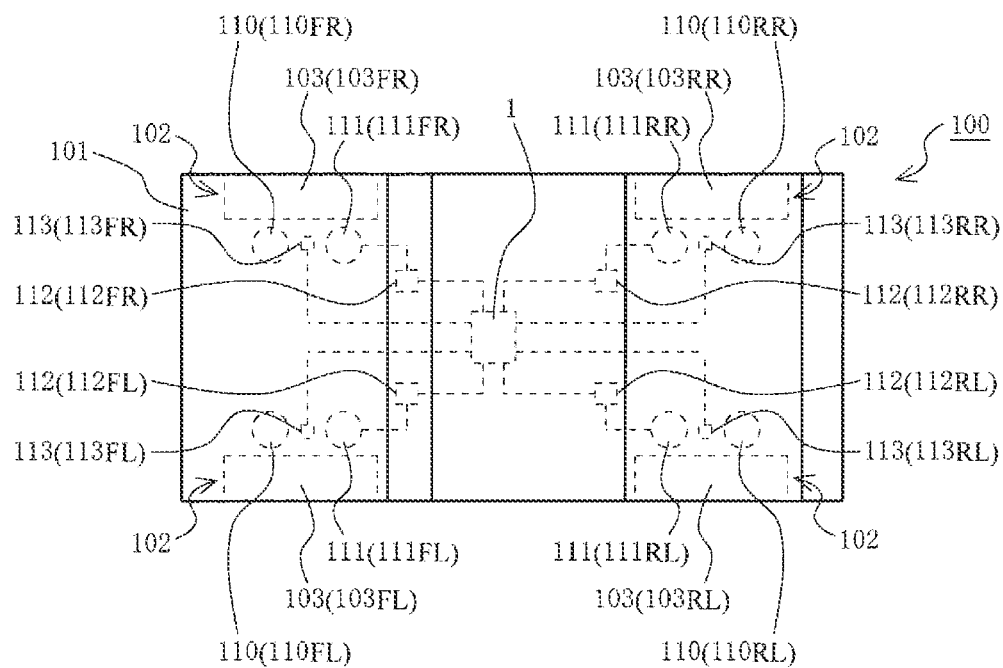

[FIG. 3]
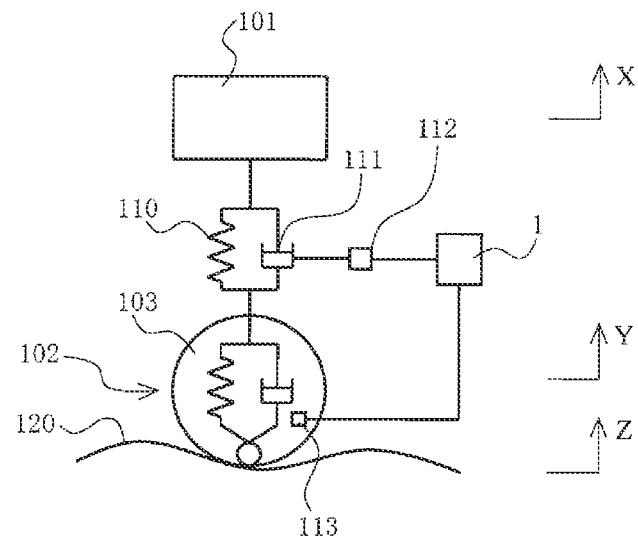
[FIG. 4]
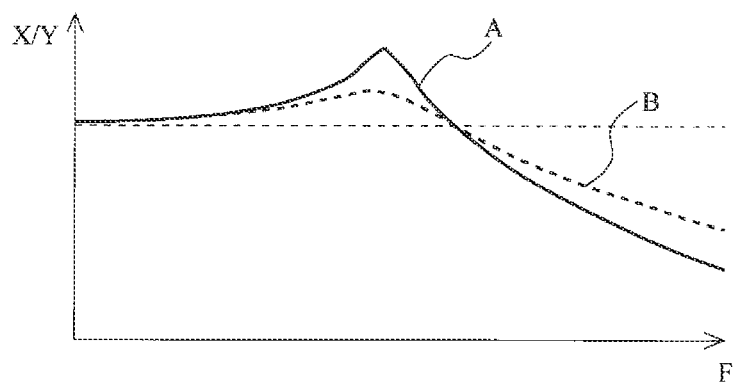
[FIG. 5]
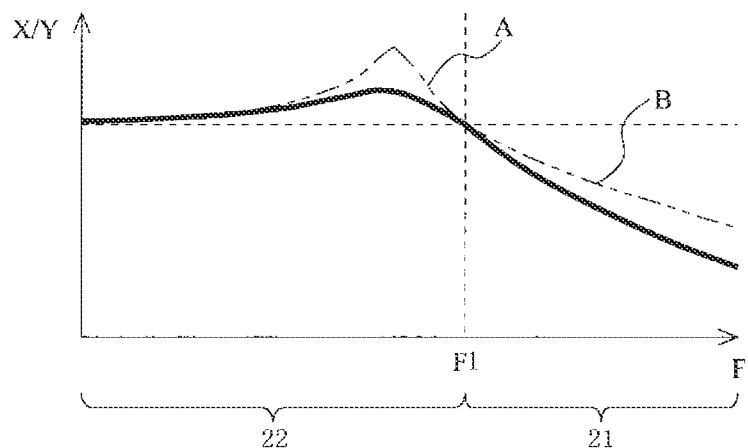

[FIG. 6]
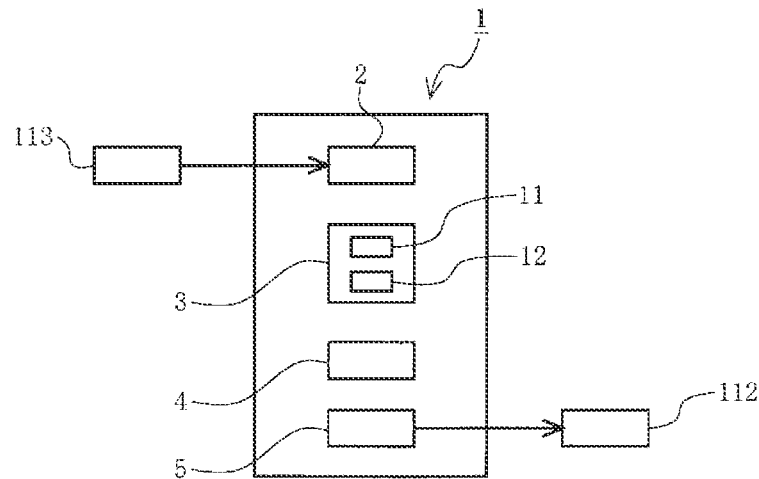
[FIG. 7]
[FIG. 8]
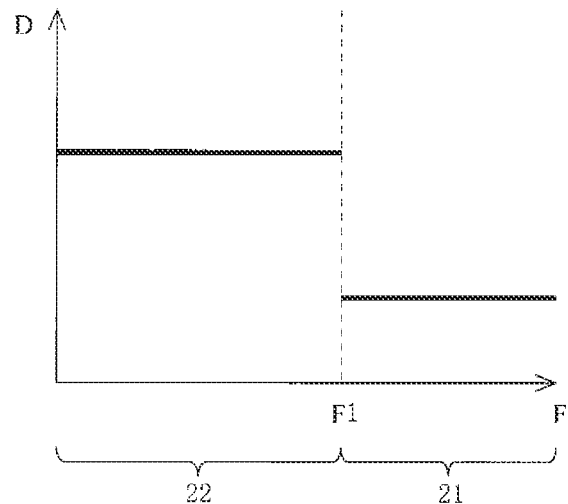

[FIG. 9]
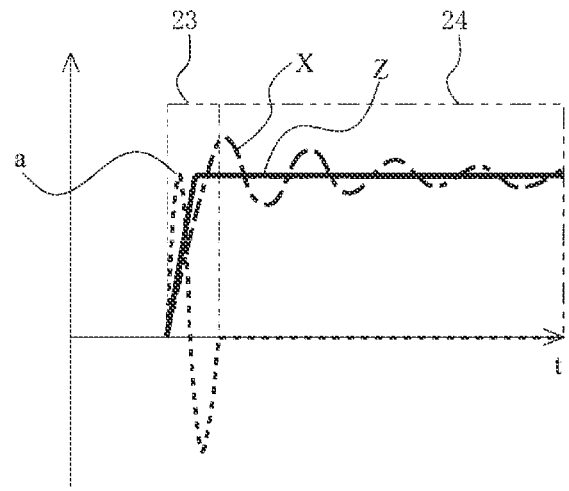
[FIG. 10]
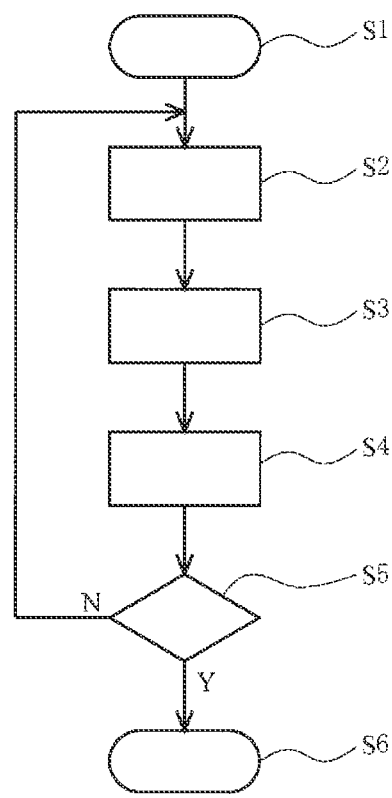

[FIG. 11]
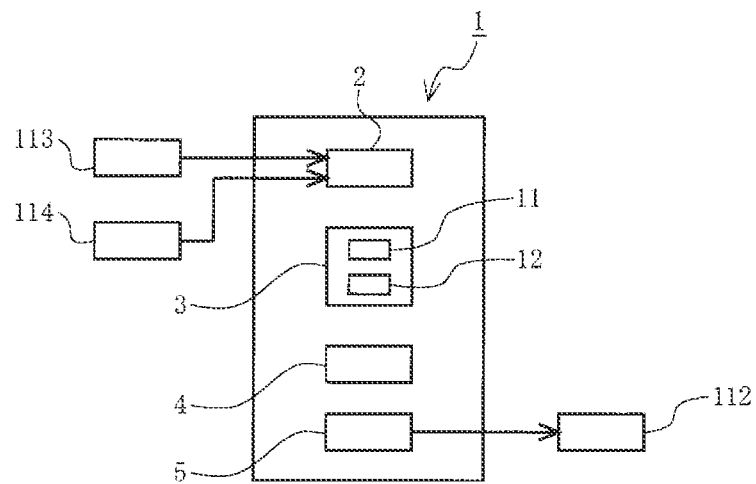
[FIG. 12]
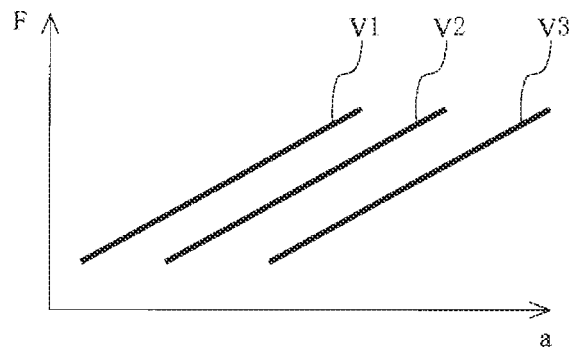
[FIG. 13]
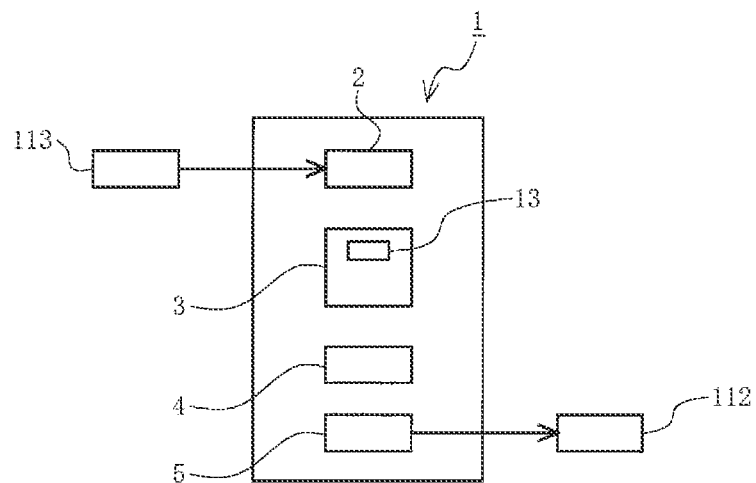

[FIG. 14]
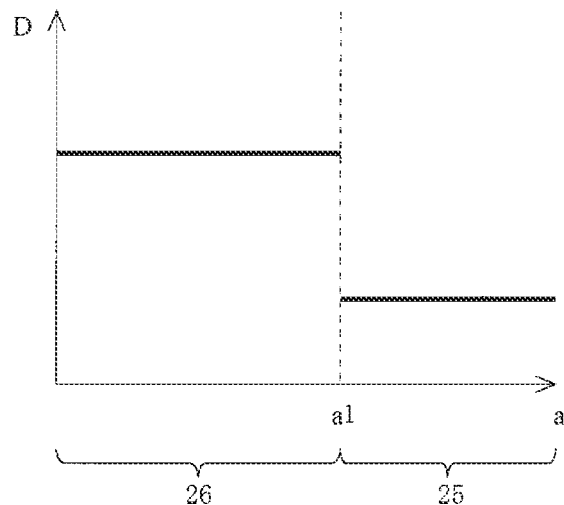
[FIG. 15]
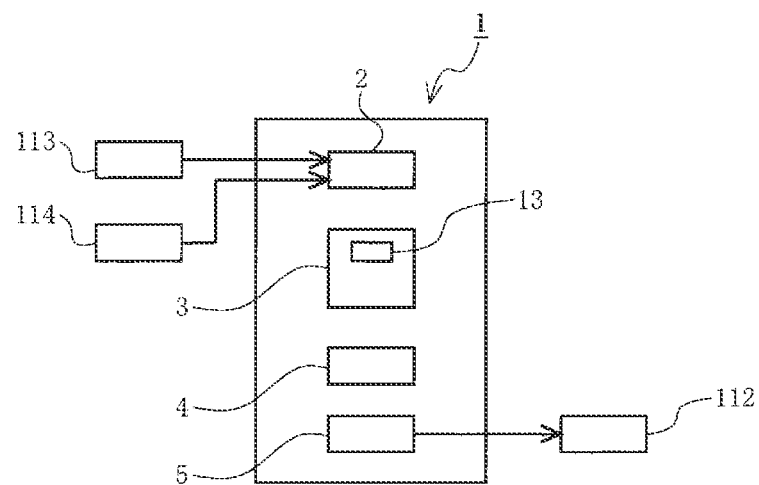
[FIG. 16]
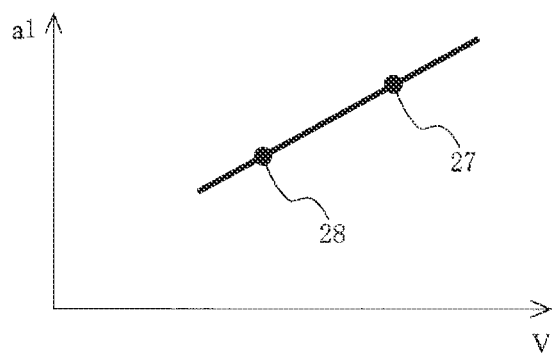

CONTROLLER, VEHICLE, AND CONTROL METHOD

BACKGROUND OF THE INVENTION

The present invention relates to a controller used to adjust a damping coefficient of a shock absorber of a damping force adjustment type mounted to a vehicle, a vehicle including the controller, and a control method used to adjust the damping coefficient of the shock absorber of the damping force adjustment type mounted to the vehicle.

Conventionally, a vehicle including a shock absorber of a damping force adjustment type between a vehicle body and each wheel has been known (see JP-A-7-179113). The shock absorber of the damping force adjustment type is a shock absorber, a damping coefficient of which is adjusted to the damping coefficient corresponding to a command signal received from a controller by an actuator. That is, a damping force of the shock absorber of the damping force adjustment type can be changed at the same compression/expansion speed by changing the damping coefficient. The conventional vehicle including the shock absorber of the damping force adjustment type between the vehicle body and each of the wheels adjusts the damping coefficient of each of the shock absorbers during turning of the vehicle to suppress rolling that occurs to a vehicle body, for example.

SUMMARY OF THE INVENTION

A portion on the wheel side with the shock absorber being a reference in the vehicle will be referred to as a so-called unsprung portion. During travel of the vehicle, the unsprung portion vibrates at various frequencies depending on a condition of a road surface, on which the vehicle travels, and the like. At this time, in the conventional vehicle including the shock absorber of the damping force adjustment type between the vehicle body and each of the wheels, depending on the frequency of the vibration of the unsprung portion, the damping coefficient of the shock absorber is not a preferred damping coefficient at the time of suppressing vertical motion of the vehicle body. Thus, there is a problem that comfort of an occupant worsens.

The present invention has been made in view of the above-described problem as the background and therefore has a first purpose of obtaining a controller that is mounted to a vehicle including a shock absorber of a damping force adjustment type between a vehicle body and a wheel, that outputs a command signal corresponding to the damping coefficient of the shock absorber to an actuator for adjusting the damping coefficient of the shock absorber, and that can suppress worsening of comfort of an occupant in the vehicle in comparison with the background art. The present invention has a second purpose of obtaining a vehicle including such a controller. The present invention has a third purpose of obtaining a control method that is used for a vehicle including: a shock absorber of a damping force adjustment type provided between a vehicle body and a wheel; and an actuator for adjusting a damping coefficient of the shock absorber, that outputs a command signal corresponding to the damping coefficient of the shock absorber to the actuator, and that can suppress worsening of comfort of an occupant in the vehicle in comparison with the background art.

A controller according to the present invention is a controller that is mounted to a vehicle including a shock absorber of a damping force adjustment type provided between a vehicle body and a wheel and outputs a command signal corresponding to a damping coefficient of the shock absorber to an actuator that adjusts the damping coefficient of the shock absorber. In the case where, in the vehicle, a portion on the wheel side with the shock absorber being a reference is set as an unsprung portion, where a state where a frequency of the unsprung portion is higher than a prescribed frequency is set as a first frequency state, and where a state where the frequency of the unsprung portion is lower than the prescribed frequency is set as a second frequency state, the controller is configured to output, to the actuator, such a command signal that reduces the damping coefficient of the shock absorber to be smaller than the damping coefficient of the shock absorber in the second frequency state when a state becomes the first frequency state.

A vehicle according to the present invention includes: a vehicle body; a wheel; a shock absorber of a damping force adjustment type provided between the vehicle body and the wheel; an actuator that adjusts a damping coefficient of the shock absorber; and the controller according to the present invention.

A control method according to the present invention is a control method for outputting a command signal that corresponds to a damping coefficient of a shock absorber to an actuator, the control method being used for a vehicle that includes: the shock absorber of a damping force adjustment type provided between a vehicle body and a wheel; and the actuator that adjusts the damping coefficient of the shock absorber. The control method includes, in the case where, in the vehicle, a portion on the wheel side with the shock absorber being a reference is set as an unsprung portion, where a state where a frequency of the unsprung portion is higher than a prescribed frequency is set as a first frequency state, and where a state where the frequency of the unsprung portion is lower than the prescribed frequency is set as a second frequency state, a transmission step of outputting, to the actuator, the command signal that reduces the damping coefficient of the shock absorber to be smaller than the damping coefficient of the shock absorber in the second frequency state when a state becomes the first frequency state.

In the case where a frequency of a vibration of the unsprung portion is low, vertical motion of the vehicle body can be suppressed by increasing the damping coefficient of the shock absorber. On the other hand, in the case where the frequency of the vibration of the unsprung portion is high, the vertical motion of the vehicle body can be suppressed by reducing the damping coefficient of the shock absorber. When the controller and the control method according to the present invention are used, the damping coefficient of the shock absorber is smaller in the first frequency state where the frequency of the unsprung portion is higher than the prescribed frequency than in the second frequency state where the frequency of the unsprung portion is lower than the prescribed frequency. In other words, when the controller and the control method according to the present invention are used, the damping coefficient of the shock absorber is larger in the second frequency state where the frequency of the unsprung portion is lower than the prescribed frequency than in the first frequency state where the frequency of the unsprung portion is higher than the prescribed frequency. Accordingly, when the controller and the control method according to the present invention are used, the vertical motion of the vehicle body can be suppressed from a state where the frequency of the vibration of the unsprung portion becomes the low frequency to a state where the frequency of the vibration of the unsprung portion becomes the high frequency. That is, in the vehicle that includes the controller and the control method according to the present invention, when compared to the background art, the vertical motion of the vehicle body can be suppressed in a frequency range of the vibration of the unsprung portion where comfort of an occupant worsens in the conventional vehicle, and thus worsening of the comfort of the occupant can be suppressed.

BRIEF DESCRIPTION OF THE DRAWINGS

FIG. 1 is a side view of a vehicle according to an embodiment of the present invention.

FIG. 2 is a plan view of the vehicle according to the embodiment of the present invention.

FIG. 3 is a view for illustrating a way of controlling a damping coefficient of each shock absorber by a controller according to the embodiment of the present invention.

FIG. 4 is a graph illustrating a relationship between a frequency F of an unsprung portion and a gain X/Y of the vehicle in the configuration illustrated in FIG. 3 in the case where a command signal that is output from the controller to an actuator is constant.

FIG. 5 is a graph illustrating the relationship between the frequency F of the unsprung portion and the gain X/Y of the vehicle in the vehicle according to the embodiment of the present invention.

FIG. 6 is a block diagram illustrating the controller according to the embodiment of the present invention.

FIG. 7 is a graph illustrating a content of first data that is stored in a storage section of the controller according to the embodiment of the present invention.

FIG. 8 is a graph illustrating a content of second data that is stored in the storage section of the controller according to the embodiment of the present invention.

FIG. 9 is a graph for illustrating an effect that is acquired by controlling the damping coefficient of the shock absorber on the basis of a detection value of an acceleration sensor in the vehicle according to the embodiment of the present invention.

FIG. 10 is a flowchart illustrating operation of the controller according to the embodiment of the present invention.

FIG. 11 is a block diagram illustrating a modified example of the controller according to the embodiment of the present invention.

FIG. 12 is a graph illustrating the content of the first data that is stored in the storage section of the controller illustrated in FIG. 11.

FIG. 13 is a block diagram illustrating another modified example of the controller according to the embodiment of the present invention.

FIG. 14 is a graph illustrating a content of data that is stored in the storage section of the controller illustrated in FIG. 13.

FIG. 15 is a block diagram illustrating further another modified example of the controller according to the embodiment of the present invention.

FIG. 16 is a graph for illustrating association of the data in the controller illustrated in FIG. 15 with a speed of the vehicle.

DETAILED DESCRIPTION

A description will hereinafter be made on a controller and a vehicle according to the present invention with reference to the drawings.

A description will hereinafter be made on a four-wheeled motor vehicle as an example of the vehicle according to the present invention. However, the vehicle according to the present invention may be a vehicle other than the four-wheeled motor vehicle. Examples of the vehicle other than the four-wheeled motor vehicle are a pedal-driven vehicle, a two-wheeled motor vehicle, and a three-wheeled motor vehicle, each of which has at least one of an engine and an electric motor as a drive source. The pedal-driven vehicle means a vehicle in general that can travel forward on a road by a depression force applied to pedals. That is, the pedal-driven vehicles include a normal pedal-driven vehicle, an electrically-assisted pedal-driven vehicle, an electric pedal-driven vehicle, and the like. The two-wheeled motor vehicle or the three-wheeled motor vehicle means a so-called motor-cycle, and the motorcycles include a bike, a scooter, an electric scooter, and the like.

A configuration, operation, and the like, which will be described below, constitute merely one example, and the present invention is not limited to a case with such a configuration, such operation, and the like. In the drawings, the same or similar members or portions will be denoted by the same reference sign or will not be denoted by the reference sign. A detailed structure will appropriately be illustrated in a simplified manner or will not be illustrated.

A description will hereinafter be made on a controller 1 according to an embodiment and a vehicle 100 that includes the controller 1.

<Configurations of Vehicle and Controller>

FIG. 1 is a side view of the vehicle according to the embodiment of the present invention. FIG. 2 is a plan view of the vehicle according to the embodiment of the present invention. In FIG. 1 and FIG. 2, a left side of each sheet corresponds to a front side of the vehicle 100.

The vehicle 100 includes a vehicle body 101 and a wheel 103. The vehicle 100 according to this embodiment is a four-wheeled motor vehicle and includes the four wheels 103. More specifically, the vehicle 100 includes, as the wheels 103, a front left wheel 103FL, a front right wheel 103FR, a rear left wheel 103RL, and a rear right wheel 103RR.

The vehicle 100 also includes a spring 110 and a shock absorber 111. The spring 110 and the shock absorber 111 are provided between the vehicle body 101 and each of the wheels 103. Thus, the vehicle 100 includes the four springs 110 and the four shock absorbers 111. More specifically, the vehicle 100 includes, as the springs 110, a spring 110FL, a spring 110FR, a spring 110RL, and a spring 110RR. The vehicle 100 includes, as the shock absorbers 111, a shock absorber 111FL, a shock absorber 111FR, a shock absorber 111RL, and a shock absorber 111RR.

The spring 110FL and the shock absorber 111FL are provided between the vehicle body 101 and the front left wheel 103FL. The spring 110FR and the shock absorber 111FR are provided between the vehicle body 101 and the front right wheel 103FR. The spring 110RL and the shock absorber 111RL are provided between the vehicle body 101 and the rear left wheel 103RL. The spring 110RR and the shock absorber 111RR are provided between the vehicle body 101 and the rear right wheel 103RR.

The shock absorber 111 according to this embodiment is a shock absorber of a damping force adjustment type. Thus, the vehicle 100 includes an actuator 112 that adjusts a damping coefficient of the shock absorber 111. The actuator 112 is provided for each of the shock absorbers 111. More specifically, the vehicle 100 includes the four actuators 112. Further more specifically, the vehicle 100 includes, as the actuators 112, an actuator 112FL, an actuator 112FR, an actuator 112RL, and an actuator 112RR. The actuator 112FL adjusts the damping coefficient of the shock absorber 111FL. The actuator 112FR adjusts the damping coefficient of the shock absorber 111FR. The actuator 112RL adjusts the damping coefficient of the shock absorber 111RL. The actuator 112RR adjusts the damping coefficient of the shock absorber 111RR. Any of various known shock absorbers can be used as the shock absorber 111 as long as the shock absorber is of the damping force adjustment type. For example, in the case where the shock absorber 111 is a hydraulic shock absorber, the actuator 112 controls a channel cross-sectional area of a channel, through which hydraulic oil for the shock absorber 111 flows, and thereby controls the damping coefficient of the shock absorber 111. Meanwhile, for example, in the case where the shock absorber 111 is a magnetic fluid shock absorber, the actuator 112 controls a magnetic field or an electric field that acts on a magnetic fluid for the shock absorber 111, controls kinetic viscosity of the magnetic fluid, and thereby controls the damping coefficient of the shock absorber 111.

The vehicle 100 includes the controller 1. More specifically, the controller 1 is mounted to the vehicle 100. Sections of the controller 1 may be disposed collectively or may be disposed separately. The controller 1 may be configured to include a microcomputer, a microprocessor unit, or the like, may be configured to include a member in which firmware and the like can be updated, or may be configured to include a program module or the like that is executed by a command from a CPU or the like, for example.

The controller 1 is electrically connected to the actuator 112. The controller 1 outputs a command signal, which corresponds to the damping coefficient of the shock absorber 111, to the actuator 112. More specifically, in this embodiment, the controller 1 outputs the command signal, which corresponds to the damping coefficient of the shock absorber 111FL, to the actuator 112FL. The controller 1 outputs the command signal, which corresponds to the damping coefficient of the shock absorber 111FR, to the actuator 112FR. The controller 1 outputs the command signal, which corresponds to the damping coefficient of the shock absorber 111RL, to the actuator 112RL. The controller 1 outputs the command signal, which corresponds to the damping coefficient of the shock absorber 111RR, to the actuator 112RR.

The command signal that is output from the controller 1 varies by a type of the shock absorber 111 and a type of the actuator 112. For example, in a case of a configuration that the damping coefficient of the shock absorber 111 is changed according to a current value into the actuator 112, the command signal that is output from the controller 1 is the current. That is, the controller 1 outputs the current, the value of which corresponds to the damping coefficient of the shock absorber 111, to the actuator 112. Meanwhile, for example, in a case of a configuration that the damping coefficient of the shock absorber 111 is changed according to a voltage value into the actuator 112, the command signal that is output from the controller 1 is the voltage. That is, the controller 1 outputs the voltage, the value of which corresponds to the damping coefficient of the shock absorber 111, to the actuator 112.

In this embodiment, the vehicle 100 includes an acceleration sensor 113 that is electrically connected to the controller 1. The acceleration sensor 113 detects vertical acceleration of an unsprung portion 102. In the vehicle 100, the unsprung portion 102 is a portion on the wheel 103 side with the shock absorber 111 being a reference. For example, the wheel 103, an unillustrated hub, an unillustrated axle, and the like are included in the unsprung portion 102. In this embodiment, the vehicle 100 includes, as the acceleration sensors 113, an acceleration sensor 113FL, an acceleration sensor 113FR, an acceleration sensor 113RL, and an acceleration sensor 113RR.

The acceleration sensor 113FL is provided at a position near the shock absorber 111FL in the unsprung portion 102. The acceleration sensor 113FL detects the vertical acceleration that is generated to a portion near the shock absorber 111FL in the unsprung portion 102. The acceleration sensor 113FR is provided at a position near the shock absorber 111FR in the unsprung portion 102. The acceleration sensor 113FR detects the vertical acceleration that is generated to a portion near the shock absorber 111FR in the unsprung portion 102. The acceleration sensor 113RL is provided at a position near the shock absorber 111RL in the unsprung portion 102. The acceleration sensor 113RL detects the vertical acceleration that is generated to a portion near the shock absorber 111RL in the unsprung portion 102. The acceleration sensor 113RR is provided at a position near the shock absorber 111RR in the unsprung portion 102. The acceleration sensor 113RR detects the vertical acceleration that is generated to a portion near the shock absorber 111RR in the unsprung portion 102.

The number and the arrangement positions of the acceleration sensors 113 merely constitute one example. Any number and any arrangement position of the acceleration sensor 113 can be adopted as long as the vertical acceleration, which is generated to the portion near the shock absorber 111 in each of the unsprung portions 102, can be calculated by detection, estimation, or the like.

Next, a description will be made on a way of controlling the damping coefficient of each of the shock absorbers 111 by the controller 1 with reference to a two degree-of-freedom model drawing of one wheel illustrated in FIG. 3, which will be described below.

FIG. 3 is a view for illustrating the way of controlling the damping coefficient of each of the shock absorbers by the controller according to the embodiment of the present invention. A sprung position X illustrated in FIG. 3 represents a position of the vehicle body 101 in a vertical direction. An unsprung position Y represents a position of the unsprung portion 102 in the vertical direction. A road surface position Z represents a position of a contact between a road surface 120 and the wheel 103 in the vertical direction. A reference position of each of the sprung position X, the unsprung position Y, and the road surface position Z will be defined as follows. It is assumed that the vehicle 100 is stopped at any position on the road surface 120. The position of the vehicle body 101 in this state is set as the reference position of the sprung position X. The position of the unsprung portion 102 in this state is set as the reference position of the unsprung position Y. The position of the contact between the road surface 120 and the wheel 103 in this state is set as the reference position of the road surface position Z. That is, this means that the vertical motion of the vehicle body 101 becomes more significant as a fluctuation in the sprung position X is increased. This also means that the vertical motion of the unsprung portion 102 becomes more significant as a fluctuation in the unsprung position Y is increased. This further means that unevenness of the road surface 120 in the vertical direction becomes more significant as a fluctuation in the road surface position Z is increased.

In order to understand the way of controlling the damping coefficient of each of the shock absorbers 111 by the controller 1, FIG. 3 only needs to be viewed as follows. For example, in the case where the shock absorber 111 is the shock absorber 111FL, the actuator 112 is the actuator 112FL, the acceleration sensor 113 is the acceleration sensor 113FL, the wheel 103 is the front left wheel 103FL, and the spring 110 is the spring 110FL. In the case where the shock absorber 111 is the shock absorber 111FR, the actuator 112 is the actuator 112FR, the acceleration sensor 113 is the acceleration sensor 113FR, the wheel 103 is the front right wheel 103FR, and the spring 110 is the spring 110FR. In the case where the shock absorber 111 is the shock absorber 111RL, the actuator 112 is the actuator 112 RL, the acceleration sensor 113 is the acceleration sensor 113 RL, the wheel 103 is the rear left wheel 103 RL, and the spring 110 is the spring 110RL. In the case where the shock absorber 111 is the shock absorber 111RR, the actuator 112 is the actuator 112RR, the acceleration sensor 113 is the acceleration sensor 113RR, the wheel 103 is the rear right wheel 103RR, and the spring 110 is the spring 110RR.

FIG. 4 is a graph illustrating a relationship between a frequency F of the unsprung portion and a gain X/Y of the vehicle in the configuration illustrated in FIG. 3 in the case where a command signal that is output from the controller to the actuator is constant.

The frequency F of the unsprung portion 102, which is represented by a horizontal axis of FIG. 4, represents a frequency at the time when the unsprung portion 102 vibrates vertically. That is, the frequency F of the unsprung portion 102 represents a frequency of the fluctuation in the unsprung position Y. On the horizontal axis of FIG. 4, the frequency F of the unsprung portion 102 is increased toward the right side of the sheet. The gain X/Y of the vehicle 100, which is represented by a vertical axis of FIG. 4, is acquired by dividing the sprung position X by the unsprung position Y. On the vertical axis of FIG. 4, the gain X/Y is increased toward the upper side of the sheet. The gain X/Y indicates that, as a value thereof is increased, the vehicle body 101 vibrates more significantly in the vertical direction with respect to displacement of the unsprung portion 102. FIG. 4 also illustrates a relationship between the frequency F of the unsprung portion 102 and the gain X/Y of the vehicle 100 at the time when the vehicle 100 is in a state A and a state B. Each of the state A and the state B is a state where the command signal, which is output from the controller 1 to the actuator 112, is constant. The damping coefficient of the shock absorber 111 in the state A is smaller than the damping coefficient of the shock absorber 111 in the state B.

As illustrated in FIG. 4, in a region where the frequency F of the unsprung portion 102 is relatively low, the gain X/Y in the state A is larger than the gain X/Y in the state B. In the region where the frequency F of the unsprung portion 102 is relatively low, the vehicle body 101 is more significantly moved by sympathetic vibration in the state A, where the damping coefficient of the shock absorber 111 is smaller than that in the state B, than in the state B. Thus, in the region where the frequency F of the unsprung portion 102 is relatively low, the gain X/Y in the state A becomes larger than the gain X/Y in the state B.

Meanwhile, as illustrated in FIG. 4, in a region where the frequency F of the unsprung portion 102 is relatively high, the gain X/Y in the state B becomes larger than the gain X/Y in the state A. A reason therefor is as follows. In the region where the frequency F is relatively high, in the state B where the damping coefficient of the shock absorber 111 is larger than that in the state A, motion of the vehicle body 101 as the sprung portion is delayed from motion of the unsprung portion 102, and a damping force of the shock absorber 111 acts at such timing that increases displacement of the sprung position X. As a result, the gain X/Y is increased.

As described above, in the region where the frequency F of the unsprung portion 102 is relatively low, the vertical motion of the vehicle body 101 can be suppressed with the large damping coefficient of the shock absorber 111, which improves comfort of an occupant. In other words, in the region where the frequency F of the unsprung portion 102 is relatively low, the vertical motion of the vehicle body 101 can be suppressed with the large damping coefficient of the shock absorber 111, which can suppress worsening of the comfort of the occupant. Meanwhile, in the region where the frequency F of the unsprung portion 102 is relatively high, the vertical motion of the vehicle body 101 can be suppressed with the small damping coefficient of the shock absorber 111, which improves the comfort of the occupant. In other words, in the region where the frequency F of the unsprung portion 102 is relatively high, the vertical motion of the vehicle body 101 can be suppressed with the small damping coefficient of the shock absorber 111, which can suppress worsening of the comfort of the occupant.

For this reason, the controller 1 according to this embodiment controls the damping coefficient of each of the shock absorbers 111 as illustrated in FIG. 5, which will be described below.

FIG. 5 is a graph illustrating the relationship between the frequency F of the unsprung portion and the gain X/Y of the vehicle in the vehicle according to the embodiment of the present invention. A horizontal axis of FIG. 5 is the same as the horizontal axis of FIG. 4, and a vertical axis of FIG. 5 is the same as the vertical axis of FIG. 4.

As illustrated in FIG. 5, a state where the frequency F of the unsprung portion 102 is higher than a prescribed frequency F1 is set as a first frequency state 21. In addition, a state where the frequency F of the unsprung portion 102 is lower than the prescribed frequency F1 is set as a second frequency state 22. In the case where the first frequency state 21 and the second frequency state 22 are defined just as described, when the state is brought into the first frequency state 21, the controller 1 outputs such a command signal that reduces the damping coefficient of the shock absorber 111 to be smaller than the damping coefficient of the shock absorber 111 in the second frequency state 22 to the actuator 112. That is, the controller 1 controls the damping coefficient of the shock absorber 111 such that, when the state is brought into the first frequency state 21, the damping coefficient of the shock absorber 111 becomes smaller than that in the second frequency state 22.

In this way, in the second frequency state 22 where the frequency F of the unsprung portion 102 is lower than that in the first frequency state 21, the damping coefficient of the shock absorber 111 is larger than the damping coefficient of the shock absorber 111 in the first frequency state 21. Meanwhile, in the first frequency state 21 where the frequency F of the unsprung portion 102 is higher than that in the second frequency state 22, the damping coefficient of the shock absorber 111 is smaller than the damping coefficient of the shock absorber 111 in the second frequency state 22. Accordingly, in the vehicle 100 that includes the controller 1 according to this embodiment, the vertical motion of the vehicle body 101 can be suppressed from the state where the frequency F of the unsprung portion 102 becomes low to a state where the frequency F of the unsprung portion 102 becomes high. That is, in the vehicle 100 that includes the controller 1 according to this embodiment, when compared to the background art, the vertical motion of the vehicle body 101 can be suppressed in a frequency range of the vibration of the unsprung portion where the comfort of the occupant worsens in the conventional vehicle, and thus worsening of the comfort of the occupant can be suppressed when compared to the background art.

In this embodiment, in the first frequency state 21, the command signal, which is output from the controller 1 to the actuator 112, is constant. However, in a frequency range where the frequency F of the unsprung portion 102 is in the first frequency state 21, the command signal, which is output from the controller 1 to the actuator 112, may vary. At this time, the command signal, which is output from the controller 1 to the actuator 112, may vary stepwise or may vary continuously. In addition, in this embodiment, in the second frequency state 22, the command signal, which is output from the controller 1 to the actuator 112, is constant. However, in a frequency range where the frequency F of the unsprung portion 102 is in the second frequency state 22, the command signal, which is output from the controller 1 to the actuator 112, may vary. At this time, the command signal, which is output from the controller 1 to the actuator 112, may vary stepwise or may vary continuously. Furthermore, in this embodiment, the frequency F of the unsprung portion 102 at the time when the gain X/Y=1 is the prescribed frequency F1. However, this is merely one example. The prescribed frequency F1 may be the frequency F of the unsprung portion 102 at the time when the gain X/Y<1 or may be the frequency F of the unsprung portion 102 at the time when the gain X/Y>1.

Here, for example, the controller 1 directly detects the frequency F of the unsprung portion 102 and can thereby control the above-described damping coefficient of the shock absorber 111. However, in this embodiment, the controller 1 calculates the frequency F of the unsprung portion 102 on the basis of a detection value by the acceleration sensor 113, and controls the damping coefficient of the shock absorber 111. More specifically, the controller 1 controls the damping coefficient of the shock absorber 111FL on the basis of the detection value by the acceleration sensor 113FL. The controller 1 controls the damping coefficient of the shock absorber 111FR on the basis of the detection value by the acceleration sensor 113FR. The controller 1 controls the damping coefficient of the shock absorber 111RL on the basis of the detection value by the acceleration sensor 113RL. The controller 1 controls the damping coefficient of the shock absorber 111RR on the basis of the detection value by the acceleration sensor 113RR. A description will be made on a detailed configuration of the controller 1 according to this embodiment.

<Detailed Configuration of Controller>

FIG. 6 is a block diagram illustrating the controller according to the embodiment of the present invention.

The controller 1 includes a reception section 2, a storage section 3, a damping coefficient decision section 4, and a transmission section 5.

The reception section 2 is a function section that receives the detection value by the acceleration sensor 113. That is, the reception section 2 is a function section that receives a signal corresponding to the vertical acceleration of the unsprung portion 102. The storage section 3 is a function section that stores information used at the time of calculating the damping coefficient of the shock absorber 111 on the basis of the vertical acceleration of the unsprung portion 102. In this embodiment, the storage section 3 stores first data 11 and second data 12 as the information used at the time of calculating the damping coefficient of the shock absorber 111 on the basis of the vertical acceleration of the unsprung portion 102. A detailed description on the first data 11 and the second data 12 will be made below. The damping coefficient decision section 4 is a function section that decides the damping coefficient of the shock absorber 111 on the basis of the information stored in the storage section 3. The transmission section 5 is a function section that outputs the command signal, which corresponds to the damping coefficient of the shock absorber 111 decided by the damping coefficient decision section 4, to the actuator 112.

Next, a description will be made on the first data 11 and the second data 12.

FIG. 7 is a graph illustrating a content of the first data that is stored in the storage section of the controller according to the embodiment of the present invention. A horizontal axis of FIG. 7 represents vertical acceleration a that is generated to a portion near the shock absorber 111 in the unsprung portion 102. On the horizontal axis of FIG. 7, the acceleration a is increased toward the right side of the sheet. The frequency F of the unsprung portion 102, which is represented by a horizontal axis of FIG. 7, represents the frequency at the time when the unsprung portion 102 vibrates vertically. In detail, the frequency F, which is represented on the vertical axis of FIG. 7, is the frequency at the time when the portion, in which the acceleration a is generated, in the unsprung portion 102 vibrates vertically. On the vertical axis of FIG. 7, the frequency F of the unsprung portion 102 is increased toward an upper side of the sheet.

As illustrated in FIG. 7, the first data 11 indicates a relationship between the vertical acceleration a of the unsprung portion 102 and the frequency F of the unsprung portion 102. More specifically, the first data 11 is configured that the frequency F of the unsprung portion 102 is increased with an increase in the vertical acceleration a of the unsprung portion 102.

The inventor has found, by an experiment and the like, a correlation illustrated in FIG. 7 between the vertical acceleration a of the unsprung portion 102 and the frequency F of the unsprung portion 102 around the shock absorber 111. More specifically, the frequency F of the unsprung portion 102 is increased with the increase in the vertical acceleration a that is generated in the unsprung portion 102. Thus, when the vertical acceleration a, which is generated around the shock absorber 111, is understood, it is possible to calculate the frequency F of the unsprung portion 102 around the shock absorber 111 from this acceleration a.

More specifically, when the detection value by the acceleration sensor 113FL is understood, it is possible to calculate the frequency F of the unsprung portion 102 around the shock absorber 111FL on the basis of the first data 11 illustrated in FIG. 7. In addition, when the detection value by the acceleration sensor 113FR is understood, it is possible to calculate the frequency F of the unsprung portion 102 around the shock absorber 111FR on the basis of the first data 11 illustrated in FIG. 7. Furthermore, when the detection value by the acceleration sensor 113RL is understood, it is possible to calculate the frequency F of the unsprung portion 102 around the shock absorber 111RL on the basis of the first data 11 illustrated in FIG. 7. Moreover, when the detection value by the acceleration sensor 113RR is understood, it is possible to calculate the frequency F of the unsprung portion 102 around the shock absorber 111RR on the basis of the first data 11 illustrated in FIG. 7.

Any storage format of the first data 11 in the storage section 3 can be adopted. The first data 11 may be stored in any of various conventionally known formats in the storage section 3. For example, the relationship between the vertical acceleration a of the unsprung portion 102 and the frequency F of the unsprung portion 102, which is illustrated in FIG. 7, may be converted into a table, and then the first data 11 may be stored in the storage section 3. Alternatively, for example, the relationship between the vertical acceleration a of the unsprung portion 102 and the frequency F of the unsprung portion 102, which is illustrated in FIG. 7, may be converted into a mathematical formula, and then the first data 11 may be stored in the storage section 3. In FIG. 7, the frequency F of the unsprung portion 102 is increased linearly with the increase in the vertical acceleration a of the unsprung portion 102. However, this relationship is merely one example. The way of the increase in the frequency F of the unsprung portion 102 at the time of the increase in the vertical acceleration a of the unsprung portion 102 differs by condition of the vehicle 100 (weight of the vehicle body 101, a characteristic of the spring 110, a characteristic of the shock absorber 111, a characteristic of a tire of the wheel 103, and the like). Accordingly, there is a case where, depending on the condition of the vehicle 100, the frequency F of the unsprung portion 102 is increased curvilinearly with the increase in the vertical acceleration a of the unsprung portion 102.

FIG. 8 is a graph illustrating a content of second data that is stored in the storage section of the controller according to the embodiment of the present invention. The frequency F of the unsprung portion 102, which is represented by a horizontal axis of FIG. 8, represents the frequency at the time when the unsprung portion 102 vibrates vertically. In detail, the frequency F, which is represented by the horizontal axis of FIG. 8, is the frequency at the time when the portion near the shock absorber 111 in the unsprung portion 102 vibrates vertically. On the horizontal axis of FIG. 8, the frequency F of the unsprung portion 102 is increased toward the right side of the sheet. A vertical axis of FIG. 8 represents a damping coefficient D of the shock absorber 111. On the vertical axis of FIG. 8, the damping coefficient D of the shock absorber 111 is increased toward the upper side of the sheet. Here, even in the case where the command signal, which is output from the controller 1 to the actuator 112, is set to be constant, the damping coefficient of the shock absorber 111 possibly varies when the frequency F of the unsprung portion 102 varies and a compression/extension speed of the shock absorber 111 varies. However, in FIG. 8 and the following drawings, in order to facilitate understanding of the way of controlling the damping coefficient according to this embodiment, the description will be made under the assumption that, when the command signal, which is output from the controller 1 to the actuator 112, is constant, the damping coefficient of the shock absorber 111 also remains constant.

As illustrated in FIG. 8, the second data 12 is data that indicates a relationship between the frequency F of the unsprung portion 102 and the damping coefficient D of the shock absorber 111. As described above, it is possible to calculate the frequency F of the unsprung portion 102 around each of the shock absorbers 111 by using the first data 11. The second data 12 is data that is used to calculate the damping coefficient D of each of the shock absorbers 111 on the basis of the frequency F of the unsprung portion 102 around each of the shock absorbers 111.

More specifically, when the frequency F of the unsprung portion 102 around the shock absorber 111FL is understood, it is possible to calculate the damping coefficient D of the shock absorber 111FL on the basis of the second data 12 illustrated in FIG. 8. In addition, when the frequency F of the unsprung portion 102 around the shock absorber 111FR is understood, it is possible to calculate the damping coefficient D of the shock absorber 111FR on the basis of the second data 12 illustrated in FIG. 8. Furthermore, when the frequency F of the unsprung portion 102 around the shock absorber 111RL is understood, it is possible to calculate the damping coefficient D of the shock absorber 111RL on the basis of the second data 12 illustrated in FIG. 8. Moreover, when the frequency F of the unsprung portion 102 around the shock absorber 111RR is understood, it is possible to calculate the damping coefficient D of the shock absorber 111RR on the basis of the second data 12 illustrated in FIG. 8.

As described above, when the state is brought into the first frequency state 21, the controller 1 outputs, to the actuator 112, such a command signal that reduces the damping coefficient of the shock absorber 111 to be smaller than the damping coefficient of the shock absorber 111 in the second frequency state 22. Thus, in the second data 12, the damping coefficient D of the shock absorber 111 in the first frequency state 21 is smaller than the damping coefficient D of the shock absorber 111 in the second frequency state 22.

Any storage format of the second data 12 in the storage section 3 can be adopted. The second data 12 may be stored in any of the various conventionally known formats in the storage section 3. For example, the relationship between the frequency F of the unsprung portion 102 and the damping coefficient D of the shock absorber 111, which is illustrated in FIG. 8, may be converted into a table, and then the second data 12 may be stored in the storage section 3. For example, the relationship between the frequency F of the unsprung portion 102 and the damping coefficient D of the shock absorber 111, which is illustrated in FIG. 8, may be converted into a mathematical formula, and then the second data 12 may be stored in the storage section 3.

A description will herein be made on an effect of the control of the damping coefficient of the shock absorber 111 on the basis of the detection value by the acceleration sensor 113.

FIG. 9 is a graph for illustrating the effect of the control of the damping coefficient of the shock absorber on the basis of the detection value of the acceleration sensor in the vehicle according to the embodiment of the present invention. A horizontal axis of FIG. 9 represents time t. This horizontal axis of FIG. 9 indicates a lapse of time to the right side of the sheet. FIG. 9 also indicates the road surface position Z, the sprung position X, and the vertical acceleration a that is generated to the unsprung portion 102. Values of the road surface position Z, the sprung position X, and the unsprung portion 102 are increased to the upper side of the sheet.

In FIG. 9, the road surface position Z varies. This indicates that the vehicle 100 drives over a bump. In the case where the vehicle 100 drives over the bump, the sprung position X varies around each of the shock absorbers 111 as illustrated in FIG. 9. In detail, a shock that is generated at the time when the wheel 103 passes over the bump is transferred to the vehicle body 101 as the sprung portion via the unsprung portion 102, the spring 110, and the shock absorber 111. This shock causes the forcible vertical motion of the vehicle body 101. This period in which the forcible vertical motion of the vehicle body 101 occurs will be set as a forcible displacement period 23. Thereafter, the vehicle body 101 vibrates freely. The free vibration of the vehicle body 101 is dampened by the shock absorber 111 and is eventually stopped. This period in which the vehicle body 101 vibrates freely will be set as a free vibration period 24.

In the case where the vehicle 100 drives over the bump, the vertical acceleration a, which is generated to the unsprung portion 102, varies around each of the shock absorbers 111 as illustrated in FIG. 9. In detail, when the wheel 103 passes over the bump, the vertical acceleration a, which is generated to the unsprung portion 102, is rapidly increased. Thereafter, the vertical acceleration a, which is generated to the unsprung portion 102, is reduced.

In the forcible displacement period 23, in which the shock causes the forcible vertical motion of the vehicle body 101, the frequency F of the unsprung portion 102 is increased, and the state is brought into the first frequency state 21. Accordingly, in the case where the damping coefficient of the shock absorber 111 prior to driving of the vehicle 100 over the bump is the damping coefficient in the second frequency state 22, the damping coefficient of the shock absorber 111 has to be reduced in order to suppress the vertical motion of the vehicle body 101 in the forcible displacement period 23.

In the case where the frequency F of the unsprung portion 102 is directly detected, the frequency F of the unsprung portion 102 is calculated by detecting behavior of the unsprung portion 102 in the vertical direction and subjecting such behavior into a Fourier transform or the like, for example. This frequency F of the unsprung portion 102, which is calculated by the Fourier transform or the like, is basically calculated on the basis of the past behavior of the unsprung portion 102. Here, the forcible displacement period 23 is extremely short. Thus, in the case where the frequency F of the unsprung portion 102 is directly detected by the Fourier transform or the like, there is a possibility that the forcible displacement period 23 has already elapsed at the time of the direct detection of the frequency F of the unsprung portion 102 and thus the increase in the frequency F of the unsprung portion 102 cannot be detected within the forcible displacement period 23. For this reason, in the case where the damping coefficient of the shock absorber 111 is controlled by directly detecting the frequency F of the unsprung portion 102, there is a possibility that the damping coefficient of the shock absorber 111 cannot be reduced enough within the forcible displacement period 23 and thus the vertical motion of the vehicle body 101 cannot be suppressed.

Meanwhile, as illustrated in FIG. 9, the vertical acceleration a that is generated to the unsprung portion 102 is promptly increased when the wheel 103 passes over the bump. Accordingly, compared to a case where the damping coefficient of the shock absorber 111 is controlled by directly detecting the frequency F of the unsprung portion 102, it is possible to detect the increase in the frequency F of the unsprung portion 102 at an early stage by controlling the damping coefficient of the shock absorber 111 on the basis of the detection value by the acceleration sensor 113. As a result, compared to the case where the damping coefficient of the shock absorber 111 is controlled by directly detecting the frequency F of the unsprung portion 102, it is possible to further reliably reduce the damping coefficient of the shock absorber 111 within the forcible displacement period 23 and to further suppress the vertical motion of the vehicle body 101 by controlling the damping coefficient of the shock absorber 111 on the basis of the detection value by the acceleration sensor 113.

The off-road vehicle that travels on a road surface 120 with severe irregularities drives over the irregularities over and over. Thus, a vehicle body of the off-road vehicle, which travels on the road surface 120 with the severe irregularities, forcibly and repeatedly moves vertically. Thus, the vehicle 100, for which the controller 1 according to this embodiment is used, is preferably the off-road vehicle. This is because, when the vehicle 100 travels on the road surface 120 with the severe irregularities, the vertical motion of the vehicle body 101 can be suppressed by controlling the damping coefficient of the shock absorber 111 on the basis of the detection value by the acceleration sensor 113 in comparison with the background art.

Among conventional vehicles, in each of which vertical motion of a vehicle body is suppressed, there is a vehicle in which a relative distance between a sprung portion and an unsprung portion of the vehicle is measured by a stroke sensor and the vertical motion of the vehicle body is suppressed on the basis of a detection value of the stroke sensor. The stroke sensor has a long arm section. Accordingly, in the case where such a vehicle is used as the off-road vehicle, it is concerned that the arm section of the stroke sensor contacts a rock, a branch, or the like, which causes failure of the stroke sensor. Meanwhile, in the vehicle 100 according to this embodiment, the damping coefficient of the shock absorber is controlled on the basis of the detection value by the acceleration sensor 113, and thus the stroke sensor is unnecessary. For this reason, it is possible to increase durability of the off-road vehicle by using the vehicle 100 according to this embodiment as the off-road vehicle.

<Operation of Controller>

Next, a description will be made on operation of the controller 1.

FIG. 10 is a flowchart illustrating the operation of the controller according to the embodiment of the present invention.

When a control initiation condition is satisfied, in step S1, the controller 1 initiates the control illustrated in FIG. 10. The control initiation condition is that an engine of the vehicle 100 is started, or the like. Step S2 is a reception step. In step S2, the reception section 2 of the controller 1 receives the detection value from each of the acceleration sensors 113.

Step S3 after step S2 is a damping coefficient decision step. In step S3, the damping coefficient decision section 4 of the controller 1 decides the damping coefficient of each of the shock absorbers 111. More specifically, the damping coefficient decision section 4 calculates the frequency F of the unsprung portion 102 around each of the shock absorbers 111 on the basis of the detection value by each of the acceleration sensors 113 and the first data 11 stored in the storage section 3. In addition, the damping coefficient decision section 4 decides the damping coefficient of each of the shock absorbers 111 on the basis of the frequency F of the unsprung portion 102 around each of the shock absorbers 111 and the second data 12 stored in the storage section 3.

Step S4 after step S3 is a transmission step. In step S4, the transmission section 5 of the controller 1 outputs the command signal, which corresponds to the damping coefficient of each of the shock absorbers 111 and is decided by the damping coefficient decision section 4, to the actuator 112 that adjusts the damping coefficient of each of the shock absorbers 111. That is, in the transmission step of step S4, when the state is brought into the first frequency state 21, the transmission section 5 outputs, to the actuator 112, such a command signal that reduces the damping coefficient of the shock absorber 111 to be smaller than the damping coefficient of the shock absorber 111 in the second frequency state 22. Step S5 after step S4 is a termination condition determination step. In step S5, the controller 1 determines whether a control termination condition described in step S2 to step S4 is satisfied. If the termination condition is not satisfied, the processing returns to step S2, and the controller 1 repeats the control in step S2 to step S4. On the other hand, if the termination condition is satisfied, the processing proceeds to step S6, and the controller 1 terminates the control illustrated in FIG. 10. An example of a case where the termination condition is satisfied is a case where the engine of the vehicle 100 is stopped. Another example of the case where the termination condition is satisfied is a case where, when the control of the damping coefficient of each of the shock absorbers 111 is attempted, control that is prioritized over the control described in step S2 to step S4 exists. In the case where the control that is prioritized over the control described in step S2 to step S4 no longer exists, the controller 1 initiates the control illustrated in FIG. 10 again.

<Effects of Controller>

The controller 1 is mounted to the vehicle 100 that includes the shock absorber 111 of the damping force adjustment type provided between the vehicle body 101 and the wheel 103. The controller 1 outputs the command signal, which corresponds to the damping coefficient of the shock absorber 111, to the actuator 112, which adjusts the damping coefficient of the shock absorber 111. In the vehicle 100, the portion corresponding to the wheel 103 with the shock absorber 111 being the reference is defined as the unsprung portion 102. The state where the frequency F of the unsprung portion 102 is higher than the prescribed frequency F1 is defined as the first frequency state 21. The state where the frequency F of the unsprung portion 102 is lower than the prescribed frequency F1 is defined as the second frequency state 22. With such definitions, the controller 1 is configured to output, to the actuator 112, such a command signal that reduces the damping coefficient of the shock absorber 111 to be smaller than the damping coefficient of the shock absorber 111 in the second frequency state 22 when the state is brought into the first frequency state 21.

As described above, in the vehicle 100 that includes the controller 1 configured just as described, the vertical motion of the vehicle body 101 can be suppressed from the state where the frequency F of the unsprung portion 102 becomes the low frequency to the state where the frequency F of the unsprung portion 102 becomes the high frequency. That is, in the vehicle 100 that includes the controller 1 according to this embodiment, when compared to the background art, the vertical motion of the vehicle body 101 can be suppressed in the frequency range of the vibration of the unsprung portion where the comfort of the occupant worsens in the conventional vehicle, and thus worsening of the comfort of the occupant can be suppressed when compared to the background art.

Preferably, the controller 1 is configured to calculate the frequency F of the unsprung portion 102 on the basis of the detection value by the acceleration sensor 113 and decide the damping coefficient of the shock absorber 111 on the basis of the frequency F. In the vehicle that includes the controller 1 configured just as described, it is possible to suppress the vertical motion of the vehicle body 101 at the time when the vehicle drives over the bump in comparison with the background art.

Preferably, the vehicle 100, to which the controller 1 is mounted, is the off-road vehicle. The off-road vehicle that travels on a road surface 120 with the severe irregularities drives over the irregularities over and over. The damping coefficient of the shock absorber 111 is controlled on the basis of the detection value by the acceleration sensor 113. As a result, when the vehicle 100 as the off-road vehicle travels on the road surface 120 with the severe irregularities, the vertical motion of the vehicle body 101 can be suppressed in comparison with the related art.

Modified Examples

FIG. 11 is a block diagram illustrating a modified example of the controller according to the embodiment of the present invention. FIG. 12 is a graph illustrating the content of the first data that is stored in the storage section of the controller illustrated in FIG. 11. Note that a horizontal axis of FIG. 12 is the same as the horizontal axis of FIG. 7. A vertical axis of FIG. 12 is the same as the vertical axis of FIG. 7. FIG. 12 illustrates a relationship between the acceleration a and the frequency F of the unsprung portion 102 for each of the different speeds of the vehicle 100. A speed V1 is a slower speed than a speed V2. The speed V2 is a slower speed than a speed V3.

The reception section 2 of the controller 1, which is illustrated in FIG. 11, is configured to receive the detection value by the acceleration sensor 113 and receive a signal corresponding to the speed of the vehicle 100 from a signal output device 114. Conventionally, various configurations are adopted to calculate the speed of the vehicle. For this reason, as the signal corresponding to the speed of the vehicle 100, which is received by the reception section 2, any of various signals that have conventionally been used to calculate the speed of the vehicle can be used. In addition, as the signal output device 114 that outputs the signal corresponding to the speed of the vehicle 100, any of various signal output devices, each of which outputs the signals that have conventionally been used to calculate the speed of the vehicle, can be used. For example, a configuration to calculate the speed of the vehicle on the basis of a gear stage of a transmission and an engine speed has conventionally been known. In the case where such a configuration is used for the vehicle 100, the signals received by the reception section 2 are a signal on the gear stage of the transmission and a signal on the engine speed. In addition, in the case where such a configuration is used for the vehicle 100, the signal output device 114 is a device that outputs the signal on the gear stage of the transmission and the engine speed. For example, a configuration to calculate the speed of the vehicle on the basis of a wheel rotational frequency has been known. In the case where such a configuration is used for the vehicle 100, the signal received by the reception section 2 is a signal on the wheel rotational frequency. In the case where such a configuration is used for the vehicle 100, the signal output device 114 is a wheel rotational frequency sensor.

As illustrated in FIG. 12, in the case where the vertical acceleration a of the unsprung portion 102 is the same, the frequency F of the unsprung portion 102 becomes lower as the speed of the vehicle 100 is increased. Accordingly, the first data 11, which is stored in the storage section 3 of the controller 1 illustrated in FIG. 11, is associated with the speed of the vehicle 100. More specifically, a state where the speed of the vehicle 100 is a first speed (for example, the speed V3) is set as a first speed state. A state where the speed of the vehicle 100 is a second speed (for example, the speed V2) that is slower than the first speed is set as a second speed state. In the case where the first speed state and the second speed state are defined just as described and the vertical acceleration a of the unsprung portion 102 is the same, in the first data 11 that is stored in the storage section 3 of the controller 1 illustrated in FIG. 11, the frequency F of the unsprung portion 102 in the first speed state is lower than the frequency F of the unsprung portion 102 in the second speed state.

Since the first data 11 is associated with the speed of the vehicle 100, it is possible to further accurately calculate the frequency F of the unsprung portion 102. That is, when the first data 11 is associated with the speed of the vehicle 100, it is possible to further accurately detect that the state is brought into the first frequency state 21. Therefore, when the first data 11 is associated with the speed of the vehicle 100, it is possible to further suppress the vertical motion of the vehicle body 101.

In the case where the speed of the vehicle 100 varies under a condition that the vertical acceleration a of the unsprung portion 102 is the same, in the first data 11 that is stored in the storage section 3 of the controller 1 illustrated in FIG. 11, the frequency F of the unsprung portion 102 may vary continuously, or the frequency F of the unsprung portion 102 may vary stepwise.

FIG. 13 is a block diagram illustrating another modified example of the controller according to the embodiment of the present invention. FIG. 14 is a graph illustrating a content of data that is stored in the storage section of the controller illustrated in FIG. 13. Note that a horizontal axis of FIG. 14 is the same as the horizontal axis of FIG. 7. A vertical axis of FIG. 14 is the same as the vertical axis of FIG. 8.

Instead of the first data 11 and the second data 12, data 13 is stored in the storage section 3 of the controller 1 illustrated in FIG. 13. The above-described first data 11 is the data in which the frequency F of the unsprung portion 102 is calculated from the vertical acceleration a of the unsprung portion 102. In addition, the above-described second data 12 is the data in which the damping coefficient D of the shock absorber 111 is calculated from the frequency F of the unsprung portion 102. When these first data 11 and second data 12 are put together, it is possible to create data in which the damping coefficient D of the shock absorber 111 is calculated from the vertical acceleration a of the unsprung portion 102. The data 13 is data in which the damping coefficient D of the shock absorber 111 is calculated from the vertical acceleration a of the unsprung portion 102. In other words, the data 13 is data that indicates a relationship between the vertical acceleration a of the unsprung portion 102 and the damping coefficient D of the shock absorber 111.

More specifically, as illustrated in FIG. 14, a state where the vertical acceleration a of the unsprung portion 102 is higher than prescribed acceleration a1 is set as a first acceleration state 25. A state where the vertical acceleration a of the unsprung portion 102 is lower than the prescribed acceleration a1 is set as a second acceleration state 26. The prescribed acceleration a1 is the acceleration at the time when the frequency becomes the prescribed frequency F1. In the case where the first acceleration state 25 and the second acceleration state 26 are defined just as described, in the data 13, the damping coefficient D of the shock absorber 111 in the first acceleration state 25 is smaller than the damping coefficient D of the shock absorber 111 in the second acceleration state 26. That is, the first acceleration state 25 corresponds to the first frequency state 21, and the second acceleration state 26 corresponds to the second frequency state 22.

Then, in step S3 illustrated in FIG. 10, the damping coefficient decision section 4 of the controller 1 illustrated in FIG. 13 decides the damping coefficient of each of the shock absorbers 111 on the basis of the detection value by each of the acceleration sensors 113 and the data 13 stored in the storage section 3.

Even when the damping coefficient of the shock absorber 111 is decided just as described, in the second frequency state 22 where the frequency F of the unsprung portion 102 is lower than that in the first frequency state 21, the damping coefficient of the shock absorber 111 is larger than the damping coefficient of the shock absorber 111 in the first frequency state 21. Meanwhile, in the first frequency state 21 where the frequency F of the unsprung portion 102 is higher than that in the second frequency state 22, the damping coefficient of the shock absorber 111 is smaller than the damping coefficient of the shock absorber 111 in the second frequency state 22. Accordingly, even when the damping coefficient of the shock absorber 111 is decided just as described, the vertical motion of the vehicle body 101 can be suppressed from the state where the frequency F of the unsprung portion 102 becomes the low frequency to the state where the frequency F of the unsprung portion 102 becomes the high frequency.

FIG. 15 is a block diagram illustrating further another modified example of the controller according to the embodiment of the present invention.

Similar to the controller 1 illustrated in FIG. 13, the data 13 is stored in the storage section 3 of the controller 1 illustrated in FIG. 15. The reception section 2 of the controller 1, which is illustrated in FIG. 15, is configured to receive the detection value by the acceleration sensor 113 and receive the signal corresponding to the speed of the vehicle 100 from the signal output device 114. The data 13, which is stored in the storage section 3 of the controller 1 illustrated in FIG. 15, is associated with the speed of the vehicle 100. More specifically, the data 13 is associated with the speed of the vehicle 100 as follows.

FIG. 16 is a graph for illustrating association of the data in the controller illustrated in FIG. 15 with the speed of the vehicle. A horizontal axis of FIG. 16 represents a speed V of the vehicle 100. On the horizontal axis of FIG. 16, the speed V of the vehicle 100 is increased to the right side of the sheet. A vertical axis of FIG. 16 represents the prescribed acceleration a1 illustrated in FIG. 14. On the vertical axis of FIG. 16, the prescribed acceleration a1 is increased to the upper side of the sheet.

As it is understood from FIG. 12, in the case where the frequency F of the unsprung portion 102 is the same, the vertical acceleration a of the unsprung portion 102 becomes higher as the speed of the vehicle 100 is increased. Accordingly, the prescribed acceleration a1, which is the acceleration at the time when the frequency becomes the prescribed frequency F1, becomes higher as the speed of the vehicle 100 is increased. Thus, as illustrated in FIG. 16, in the data 13 in the controller 1 illustrated in FIG. 15, the prescribed acceleration a1 becomes higher as the speed V of the vehicle 100 is increased. In other words, a state where the speed V of the vehicle 100 is the first speed is set as a first speed state 27. A state where the speed V of the vehicle 100 is the second speed that is slower than the first speed is set as a second speed state 28. In the case where the first speed state 27 and the second speed state 28 are defined just as described, the prescribed acceleration a1 in the first speed state 27 is higher than the prescribed acceleration a1 in the second speed state 28.

When the data 13 is associated with the speed of the vehicle 100, just as described, it is possible to further suppress the vertical motion of the vehicle body 101. In FIG. 16, it is configured that the prescribed acceleration a1 varies continuously according to the variation in the speed V of the vehicle 100. However, it may be configured that the prescribed acceleration a1 may vary stepwise according to the variation in the speed V of the vehicle 100.

The description has been made so far on the controller 1 according to this embodiment. However, the controller according to the present invention is not limited to that in the description of this embodiment, and only a part of this embodiment may be implemented.

REFERENCE SIGNS LIST

1: Controller
2: Reception section
3: Storage section
4: Damping coefficient decision section
5: Transmission section
11: First data
12: Second data
13: Data
21: First frequency state
22: Second frequency state
23: Forcible displacement period
24: Free vibration period
25: First acceleration state
26: Second acceleration state
27: First speed state
28: Second speed state
100: Vehicle
101: Vehicle body
102: Unsprung portion
103: Wheel
103FL: Front left wheel
103FR: Front right wheel
103RL: Rear left wheel
103RR: Rear right wheel
110 (110FL, 110FR, 110RL, 110RR): Spring
111 (111FL, 111FR, 111RL, 111RR): Shock absorber
112 (112FL, 112FR, 112RL, 112RR): Actuator
113 (113FL, 113FR, 113RL, 113RR): Acceleration sensor
114: Signal output device
120: Road surface

The invention claimed is:

1. A controller (1) configured to be connected to shock absorber (111) of a damping force adjustment type positioned between a vehicle body (101) and a wheel (103), the controller configured to:
output a command signal corresponding to a damping coefficient of the shock absorber (111) to an actuator (112) that adjusts the damping coefficient of the shock absorber (111),
determine a frequency of vibration of an unsprung portion (102) of the vehicle on the wheel (103) side with the shock absorber (111),
define a first state where the frequency of vibration of the unsprung portion (102) has increased as a first frequency state (21),
define a second state where the frequency of vibration of the unsprung portion (102) has decreased relative to the first frequency state (21) as a second frequency state (22), and
in response to the frequency of vibration of the unsprung portion (102) entering the first frequency state (21), output, to the actuator (112), the command signal which reduces the damping coefficient of the shock absorber (111) to be smaller than the damping coefficient of the shock absorber (111) in the second frequency state (22), wherein the controller further includes
a reception section (2) that receives a vertical acceleration signal corresponding to vertical acceleration of the unsprung portion (102);
a storage section (3) that stores information used in calculating the damping coefficient of the shock absorber (111);
a damping coefficient decision section (4) that decides the damping coefficient of the shock absorber (111) based on the information; and
a transmission section (5) that outputs, to the actuator (112), the command signal corresponding to the damping coefficient of the shock absorber (111) decided by the damping coefficient decision section (4),
wherein the information that is stored in the storage section (3) includes data (13) on a relationship between the vertical acceleration of the unsprung portion (102) and the damping coefficient of the shock absorber (111),
wherein a state where the vertical acceleration of the unsprung portion (102) is higher than a prescribed acceleration (a1) is defined as a first acceleration state (25),
wherein a state where the vertical acceleration of the unsprung portion (102) is lower than the prescribed acceleration (a1) is defined as a second acceleration state (26),
wherein in the data (13), the damping coefficient of the shock absorber (111) in the first acceleration state (25) is smaller than the damping coefficient of the shock absorber (111) in the second acceleration state (26),
wherein the reception section (2) is configured to receive a speed signal corresponding to a speed of the vehicle (100),
wherein the data (13) is vehicle speed data (100),
wherein a state where the speed of the vehicle (100) is a first speed is defined as a first speed state (27),
wherein a state where the speed of the vehicle (100) is a second speed that is slower than the first speed is defined as a second speed state (28), and
wherein the prescribed acceleration (a1) in the first speed state is higher than the prescribed acceleration (a1) in the second speed state.

2. A controller (1) configured to control a shock absorber (111) of a damping force adjustment type positioned between a vehicle body (101) and a wheel (103), controller configured to:
output a command signal corresponding to a damping coefficient of the shock absorber (111) to an actuator (112) that adjusts the damping coefficient of the shock absorber (111),
determine a frequency of vibration of an unsprung portion (102) of the vehicle on the wheel (103) side with the shock absorber (111),
define a first state where the frequency of vibration of the unsprung portion (102) has increased as a first frequency state (21),
define a second state where the frequency of vibration of the unsprung portion (102) has decreased relative to the first frequency state (21) as a second frequency state (22), and
in response to the frequency of vibration of the unsprung portion (102) entering the first frequency state (21), outputting via the controller (1), to the actuator (112), the command signal which reduces the damping coefficient of the shock absorber (111) to be smaller than the damping coefficient of the shock absorber (111) in the second frequency state (22),
wherein the controller includes;
a reception section (2) that receives a vertical acceleration signal corresponding to vertical acceleration of the unsprung portion (102);

a storage section (3) that stores information used in calculating the damping coefficient of the shock absorber (111);

a damping coefficient decision section (4) that decides the damping coefficient of the shock absorber (111) based on the information; and a transmission section (5) that outputs, to the actuator (112), the command signal corresponding to the damping coefficient of the shock absorber (111) decided by the damping coefficient decision section (4), wherein the information that is stored in the storage section (3) includes:

first data (11) on a relationship between the vertical acceleration of the unsprung portion (102) and a frequency of the unsprung portion (102); and second data (12) on a relationship between the frequency of the unsprung portion (102) and the damping coefficient of the shock absorber (111), wherein the reception section (2) is configured to receive a speed signal corresponding to a speed of the vehicle (100)

wherein a state where the speed of the vehicle (100) is a first speed (V1) is defined as a first speed state, wherein a state where the speed of the vehicle (100) is a second speed (V2) that is slower than the first speed is defined as a second speed state, and wherein the frequency of the unsprung portion (102) in the first speed state is lower than the frequency of the unsprung portion (102) in the second speed state.

3. The controller (1) according to claim 2, wherein the first data (11) is configured so that, as the vertical acceleration of the unsprung portion (102) is increased, the frequency of the unsprung portion (102) is increased.

4. A vehicle (100) comprising:
a vehicle body (101);
a wheel (103);
a shock absorber (111) of a damping force adjustment type that is provided between the vehicle body (101) and the wheel (103);
an actuator (112) that adjusts a damping coefficient of the shock absorber (111); and
a controller (1) according to claim 1, 2 or 3.

5. The vehicle (100) according to claim 4, wherein the vehicle (100) is an off-road vehicle.

6. A method of controlling a shock absorber (111) of a damping force adjustment type positioned between a vehicle body (101) and a wheel (103), the method comprising:

outputting, via a controller (1) connected to the shock absorber (111), a command signal corresponding to a damping coefficient of the shock absorber (111) to an actuator (112) that adjusts the damping coefficient of the shock absorber (111), determining, via the controller (1), a frequency of vibration of an unsprung portion (102) of the vehicle on the wheel (103) side with the shock absorber (111), defining, via the controller (1), a first state where the frequency of vibration of the unsprung portion (102) has increased as a first frequency state (21), defining, via the controller (1), a second state where the frequency of vibration of the unsprung portion (102) has decreased relative to the first frequency state (21) as a second frequency state (22), and in response to the frequency of vibration of the unsprung portion (102) entering the first frequency state (21), outputting via the controller (1), to the actuator (112), the command signal which reduces the damping coefficient of the shock absorber (111) to be smaller than the damping coefficient of the shock absorber (111) in the second frequency state (22), wherein the controller includes;

a reception section (2) that receives a vertical acceleration signal corresponding to vertical acceleration of the unsprung portion (102);

a storage section (3) that stores information used in calculating the damping coefficient of the shock absorber (111);

a damping coefficient decision section (4) that decides the damping coefficient of the shock absorber (111) based on the information; and a transmission section (5) that outputs, to the actuator (112), the command signal corresponding to the damping coefficient of the shock absorber (111) decided by the damping coefficient decision section (4), wherein the information that is stored in the storage section (3) includes:

data (13) on a relationship between the vertical acceleration of the unsprung portion (102) and the damping coefficient of the shock absorber (111), wherein a state where the vertical acceleration of the unsprung portion (102) is higher than a prescribed acceleration (a1) is defined as a first acceleration state (25), wherein a state where the vertical acceleration of the unsprung portion (102) is lower than the prescribed acceleration (a1) is defined as a second acceleration state (26), wherein in the data (13), the damping coefficient of the shock absorber (111) in the first acceleration state (25) is smaller than the damping coefficient of the shock absorber (111) in the second acceleration state (26), wherein the reception section (2) is configured to receive a speed signal corresponding to a speed of the vehicle (100), wherein the data (13) is vehicle speed data (100), wherein a state where the speed of the vehicle (100) is a first speed is defined as a first speed state (27), wherein a state where the speed of the vehicle (100) is a second speed that is slower than the first speed is defined as a second speed state (28), and wherein the prescribed acceleration (a1) in the first speed state is higher than the prescribed acceleration (a1) in the second speed state.

7. A method of controlling a shock absorber (111) of a damping force adjustment type positioned between a vehicle body (101) and a wheel (103), the method comprising:

outputting, via a controller (1) connected to the shock absorber (111), a command signal corresponding to a damping coefficient of the shock absorber (111) to an actuator (112) that adjusts the damping coefficient of the shock absorber (111), determining, via the controller (1), a frequency of vibration of an unsprung portion (102) of the vehicle on the wheel (103) side with the shock absorber (111), defining, via the controller (1), a first state where the frequency of vibration of the unsprung portion (102) has increased as a first frequency state (21), defining, via the controller (1), a second state where the frequency of vibration of the unsprung portion (102) has decreased relative to the first frequency state (21) as a second frequency state (22), and in response to the frequency of vibration of the unsprung portion (102) entering the first frequency state (21), outputting via the controller (1), to the actuator (112), the command signal which reduces the damping coefficient of the shock absorber (111) to be smaller than the damping coefficient of the shock absorber (111) in the second frequency state (22), wherein the controller includes;

a reception section (2) that receives a vertical acceleration signal corresponding to vertical acceleration of the unsprung portion (102);

a storage section (3) that stores information used in calculating the damping coefficient of the shock absorber (111);

a damping coefficient decision section (4) that decides the damping coefficient of the shock absorber (111) based on the information; and a transmission section (5) that outputs, to the actuator (112), the command signal corresponding to the damping coefficient of the shock absorber (111) decided by the damping coefficient decision section (4), wherein the information that is stored in the storage section (3) includes:

first data (11) on a relationship between the vertical acceleration of the unsprung portion (102) and a frequency of the unsprung portion (102); and second data (12) on a relationship between the frequency of the unsprung portion (102) and the damping coefficient of the shock absorber (111), wherein the reception section (2) is configured to receive a speed signal corresponding to a speed of the vehicle (100)

wherein a state where the speed of the vehicle (100) is a first speed (V1) is defined as a first speed state, wherein a state where the speed of the vehicle (100) is a second speed (V2) that is slower than the first speed is defined as a second speed state, and wherein the frequency of the unsprung portion (102) in the first speed state is lower than the frequency of the unsprung portion (102) in the second speed state.

\* \* \* \* \*